United States Patent
Bussi et al.

(12)

(10) Patent No.: US 6,506,830 B1
(45) Date of Patent: Jan. 14, 2003

(54) ANTISTATIC COMPOSITIONS BASED ON POLYAMIDE

(75) Inventors: Philippe Bussi, Bernay (FR); Frédérique Pery, Saint Cyr de Salerne (FR); Jacques Thomasset, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/582,283

(22) PCT Filed: Dec. 11, 1998

(86) PCT No.: PCT/FR98/02703
§ 371 (c)(1),
(2), (4) Date: Oct. 6, 2000

(87) PCT Pub. No.: WO99/33908
PCT Pub. Date: Jul. 8, 1999

(30) Foreign Application Priority Data

Dec. 23, 1997 (FR) .............................. 97 16406

(51) Int. Cl.⁷ ................................. C08K 3/00
(52) U.S. Cl. ...................... 524/495; 524/496; 524/252; 524/511
(58) Field of Search ................. 524/495, 496, 524/847, 223; 252/511

(56) References Cited

U.S. PATENT DOCUMENTS

| | | | |
|---|---|---|---|
| 5,084,504 A | 1/1992 | Saburo et al. | 524/496 |
| 5,179,155 A | 1/1993 | Saburo et al. | 524/496 |
| 5,705,555 A * | 1/1998 | Guilfoy et al. | 524/495 |
| 5,916,945 A * | 6/1999 | Bussi et al. | 524/427 |
| 6,197,858 B1 * | 3/2001 | Hagano et al. | 524/496 |
| 6,265,529 B1 * | 7/2001 | Chung et al. | 528/310 |

FOREIGN PATENT DOCUMENTS

| | | |
|---|---|---|
| FR | 2 089 734 | 1/1972 |
| FR | 2 460 198 | 1/1981 |
| FR | 2 742 445 | 6/1997 |

* cited by examiner

Primary Examiner—Margaret Medley
(74) Attorney, Agent, or Firm—Millen, White, Zelano & Branigan, P.C.

(57) ABSTRACT

This antistatic polyamide composition, comprising at least one polyamide and a sufficient amount of carbon black to make it antistatic, is characterized by the fact that the carbon black is at least a carbon black that is selected from among those having a specific BET surface area, measured according to ASTM Standard D 3037-89, from 5 to 200 m²/g, and DBP absorption, measured according to ASTM Standard D 2414-90, from 50 to 300 ml/100 g.

12 Claims, No Drawings

ANTISTATIC COMPOSITIONS BASED ON POLYAMIDE

This invention relates to compositions based on polyamide that can be used in particular for the production of single-layer or multilayer tubes and/or ducts in the field of transport and/or storage of hydrocarbons.

In automobiles, under the action of the injection pump, the gasoline circulates at high speed in the tubes that connect the engine to the tank, whereby these tubes are obtained from compositions that are based primarily on polyamide 11 or 12 (RILSAN). In some cases, the rubbing of gasoline/ inside wall of the tube can produce electrostatic charges, whose accumulation can lead to an electric discharge (spark) that can ignite the gasoline with catastrophic consequences (explosion). Also, it is necessary to limit the surface resistivity of the inside face of the tube to a value that is generally less than $10^6$ ohms ($\Omega$).

Furthermore, these polyamide-based compositions should meet the other criteria of the specifications of the gasoline line and in particular cold shock resistance. In addition, the polyamide composition, made antistatic, should be extrudable: it is therefore sought to limit as much as possible its viscosity in the molten state. It should also be chemically resistant to peroxidized gasolines.

It is known to lower the surface resistivity of resins or polymeric materials by incorporating in them conductive and/or semiconductive materials, such as carbon black, steel fibers, carbon fibers, particles (fibers, strips, spheres, etc.) that are gold-, silver- or nickel-plated or covered by a fine layer of polymer that is inherently conductive or semiconductive.

Among these materials, the carbon black is used more particularly because of its great commercial availability and its good performances.

When the level of carbon black is increased in a polymeric composition, the resistivity first changes little. Then, when a critical level of carbon black, called percolation threshold, is reached, the resistivity drops very abruptly until a relatively stable level (plateau zone) is reached, where increasing the carbon black level brings about very little change in resistivity.

The technical report "Ketjenblack EC—BLACK 94/01" of the AKZO NOBEL Company indicates that a conductive and/or semi-conductive carbon black is all the more effective—i.e., it is necessary to add little of it to the polymer to give it antistatic properties—as its structure is developed. The structure of a carbon black reflects the manner in which the basic carbon-containing particles that constitute the carbon black are arranged in aggregates, even in agglomerates. The structure of a carbon black can be expressed by its specific surface area (measured by the nitrogen adsorption method—BET method—according to ASTM Standard D 3037-89), as well as by its DBP (di-butyl-phthalate) absorption (measured according to ASTM Standard D 2414-90). The carbon blacks that are marketed by the AKZO NOBEL Company are very structured and characterized by a large BET surface area and high DBP absorption. They are often designated as extra-conductive carbon blacks. Thanks to their developed structure, the percolation threshold is reached at a low addition rate.

Beyond its electro conductive and/or semi-conductive properties, the carbon black acts like a filler, such as, for example, talc, chalk, kaolin, and therefore affects many other physical and chemical properties.

Thus, one skilled in the art knows that when the proportion of filler increases, the viscosity of the polymer/ feedstock mixture increases, as well as the modulus of elasticity of the composition. The increase in viscosity is observed by, for example, a measure of the fluidity index (MWI=melt flow index). Also, when the capacity factor increases, the durability or resistance to impact of the charged polymer, expressed by, for example, measurement of elongation at break or impact strength, decreases. The increase of the viscosity and the reduction of the impact resistance are all the larger the higher the proportion of filler.

Thus, one skilled in the art naturally prefers to reduce the proportion of filler to impart the desired property to the polymer/feedstock mixture while affecting the other properties, such as viscosity or impact resistance, as little as possible. Thus, if the task at hand is to obtain a low surface resistivity, one skilled in the art will rather use extra-conductive carbon blacks.

It was thus noted that for polyamide 12, with inherent viscosity 1.65 (measured at 20° C. for a sample of 0.5 g in 100 g of meta-cresol), plasticized by 11.4% by mass of n-butyl benzene sulfonamide (BBSA) and containing at least 6% by mass of Ketjenblack EC 600 jD carbon black of the AKZO NOBEL Company (characterized by DBP absorption that is greater than 400 ml/g and by a BET surface area that is greater than 1000 $m^2/g$), the surface resistivity on the tube is less than $10^6$ ohms. It was noted, moreover, for this same polyamide, that the plateau zone $10^2$–$10^3$ ohms) is reached starting at 10% by mass of Ketjenblack EC 600 JD carbon black.

It seems, however, that this carbon black, that can be designated as "structured" or "more structured," disperses poorly in the polyamide in the molten state, which leads to the presence of agglomerates. These agglomerates have a negative effect on the impact strength.

It has now been discovered, surprisingly enough, that by going against the teaching of the prior art that relates to, on the one hand, the selection of the type of carbon black, and, on the other hand, its amount used, namely by using a conductive carbon black and/or a "less structured" semi-conductive carbon black than the extra-conductive carbon black above and in addition by using such a carbon black in a larger amount than the preceding extra-conductive carbon black, polyamide compositions that have better impact strength as well as better Theological properties (with equivalent resistivity levels) are obtained.

The fact of using a less structured carbon black requires increasing the content to obtain the same antistatism level— generally the goal is to produce a surface resistivity of less than $10^6$ ohms. Despite this higher addition rate of carbon black, better rheological properties (a lower viscosity in the molten state, which is demonstrated by a higher fluidity index (MW-I)) and impact strength (impact resistance) are obtained. This is all the more surprising since in general— and as emphasized above—the more the proportion of filler is increased, the more it is precisely these properties that are degraded.

Thus, this invention, residing in the selection of this "less structured" carbon black, does not produce a better compromise of antistatism/other properties, but leads to a polyamide-based antistatic composition that has inherently better rheological properties and impact strength.

This invention therefore first has as its object a composition of antistatic polyamide, comprising at least one polyamide and a sufficient amount of carbon black to make it antistatic, characterized by the fact that the carbon black is at least a carbon black that is selected from among those that have a specific BET surface area, measured according to ASTM Standard D 3037-89, from 5 to 200 $m^2/g$, in particular from 20 to 100 m²/g, and DBP absorption, measured according to ASTM Standard D 2414-90, from 50 to 300 ml/100 g, in particular from 125 to 250 ml/100 g. (The measurement of the DBP absorption is that of a pore volume that is expressed in ml of di-butyl-phthalate per 100 g of carbon black.)

The carbon blacks according to the invention can be designated as conductive or semi-conductive contrary to extra-conductive carbon blacks that are used according to the prior art, which generally have a BET surface area that is greater than 500 m²/g and DBP absorption that is greater than 300 ml/100 g.

Furthermore, the polyamide-based antistatic compositions of the invention preferably contain 16 to 30% by mass of these "less structured" conductive or semi-conductive carbon black(s) and more particularly 17.5 to 23% by mass, relative to the total composition.

The polyamide-based antistatic compositions of the prior art, using "more structured" extra-conductive carbon blacks, generally contain 4 to 14% by mass, and more particularly 6 to 10% by mass to obtain the same antistatism level.

Despite the higher level of carbon black, the antistatic compositions according to the invention have a better fluidity and a better impact resistance, as will be illustrated by the examples below.

In terms of this invention, polyamide is defined as the polyamides or PA that contain aliphatic and/or cycloaliphatic and/or aromatic patterns.

It is possible to cite the polyamides that are obtained by polycondensation of one or more lactams, of $\alpha,\omega$-amino acids or by an approximately stoichiometric polycondensation of one or more aliphatic diamine(s) and one or more aliphatic carboxylic diacid(s). It is possible to use excess diamine to obtain excess amine terminal groups relative to the carboxyl terminal groups in the polyamide.

The lactams contain at least 6 carbon atoms, preferably at least 10. The preferred lactams are decalactam, undecalactam, and dodecalactam.

The preferred $\alpha,\omega$-amino acids are the 10-aminodecanoic acid, the 11-aminoundecanoic acid, and the 12-aminododecanoic acid.

The aliphatic diamines are $\alpha,\omega$-diamines that contain at least 6 carbon atoms, preferably 6 to 10 carbon atoms, between the terminal amino groups. The carbon-containing chain can be linear (polymethylene diamine) or branched or cycloaliphatic. Preferred diamines are hexamethylene diamine (HMDA), dodecamethylene diamine, and decamethylene diamine.

The carboxylic diacids can be aliphatic, cycloaliphatic or aromatic. The aliphatic carboxylic diacids are carboxylic $\alpha,\omega$-diacids that have at least 4 carbon atoms (not including the carbon atoms of carboxylic groups), preferably at least 6, in the linear or branched carbon-containing chain. The diacids are the azelaic, sebacic and 1,12-dodecanoic acids.

By way of illustration of such PA, it is possible to mention:

polyhexamethylene sebacamide (PA-6,10),
polyhexamethylene dodecanediamide (PA-6,12),
poly(undecanoamide) (PA-11),
polylauryllactam (PA-12),
polydodecamethylene dodecanediamide (PA-12,12),
polycapronamide (PA-6),
polyhexamethylene adipamide (PA-6,6).

The PA have a mean molecular mass generally greater than or equal to 5000 in number. Their inherent viscosity (measured at 20° C. for a sample of 0.5 g in 100 g of meta-cresol) is generally greater than 0.7.

In terms of this invention, PA is also defined as the mixtures of polymers that contain at least 50% by weight of the polyamides that are described above where the matrix phase consists of polyamide.

By way of example of mixtures, it is possible to cite the mixtures of aliphatic polyamides and semi-aromatic and/or; amorphous polyamides, such as those described in EP 550308, as well as the PA-polyolefin mixtures and in particular those that are described in EP 342066.

According to the invention, PA is also defined as the polyamide-based thermoplastic elastomers (TPE) that are block copolymers, also called polyetheramides or polyether block amides, whose rigid sequences consist of polyamide and crystallizable, flexible polyether sequences.

The compositions according to the invention can also contain at least one additive that is selected from among:

plasticizers;

impact additives;

phosphoric acid, phosphorus acid or hydrophosphorus acid or their esters, or sodium salts or potassium salts or combinations of these products;

dyes;

pigments, other than carbon black;

brighteners;

antioxidants;

UV stabilizers;

chain limiters; and reinforcement fillers.

The plasticizers, whose amount may be up to 30% by mass relative to the total composition, can be any plasticizers that are known in the domain of polyamides and are selected in particular from among the benzene sulfonamide derivatives, such as n-butyl benzene sulfonamide (BBSA) ("Ucemid A"), ethyl toluene sulfonamide ("Santicizer 8") or N-cyclohexyl toluene sulfonamide ("Santicizer 1H"); the hydroxy-benzoic acid esters, such as ethyl-2 hexyl parahydroxybenzolate (EHPB) and decyl-2 hexyl parahydroxybenzoate (DHPB); the lactams, such as caprolactam and N-methyl-pyrrolidone; the esters or ethers of tetrahydrofurfuryl alcohol, such as oligoethylene oxytetrahydrofurfuryl alcohol; and the esters of citric acid or hydroxy-malonic acid, such as oligoethylene oxymalonate. A particularly preferred plasticizer is n-butyl benzene sulfonamide (BBSA).

The impact additives, whose amount may be up to 40% by mass relative to the total composition, are, for example:

1. the polyolefins that can be defined as polymers that comprise olefin patterns, such as, for example, ethylene, propylene, butene-1 or any other alpha olefin pattern; by way of examples, it is possible to cite:

the polyethylenes, such as LDPE, HDPE, LLDPE or VLDPE;

polypropylene;

the ethylene/propylene copolymers;

the PE, in particular the VLDPE, obtained with a metallocene as a catalyst;

the copolymers of the ethylene with at least one product that is selected from among the salts or the esters of unsaturated carboxylic acids, or the vinyl esters of unsaturated carboxylic acids.

It is possible to cite in particular LLDPE, VLDPE, polypropylene, the ethylene/vinyl acetate copolymers and the ethylene/alkyl (meth)acrylate copolymers; the density of the polyolefin advantageously can be between 0.86 and 0.965, and its MFI can be between 0.3 and 40, 2. the sequenced copolymers, such as the ethylene-propylene rubber (EPR) copolymers, the styrene-b-butadiene-b-styrene (SBS) copolymers, the styrene-b-isoprene-b-styrene (SIS) copolymers, the ethylene-b-propylene-b-diene (EPDM) copolymers, the ethylene-b-propylene-b-butadiene or isoprene copolymers, the styrene-b-ethylene-butene-b-styrene (SEBS) copolymers, such as the copolymer that is marketed under the name "KRATON" by the Shell Company, 3. the enhanced-function polyolefins that can be defined as polymers that comprise alpha-olefin patterns and epoxide or carboxylic acid or carboxylic acid anhydride patterns.

By way of examples, it is possible to cite polyolefins 1) and sequenced polymers 2) that are grafted by unsaturated epoxides, such as the glycidyl (meth)acrylate and/or by carboxylic acids, such as (meth)acrylic acid and/or by unsaturated carboxylic acid anhydrides, such as the maleic anhydride.

It is also possible to cite:
the copolymers of ethylene, of an unsaturated epoxide and optionally an ester or a salt of unsaturated carboxylic acid or a vinyl ester of saturated carboxylic acid. These are, for example, the ethylene/vinyl acetate/glycidyl (meth)acrylate copolymers or the ethylene/alkyl (meth)acrylate/glycidyl (meth)acrylate copolymers; by way of examples of the latter, it is possible to mention those that are marketed under the name "LOTADER" by the ELF ATOCHEM Company;

the copolymers of ethylene, an unsaturated carboxylic acid anhydride and/or an unsaturated carboxylic acid that can be partially neutralized by a metal (Zn) or an alkali (Li) and optionally an unsaturated carboxylic acid ester or a saturated carboxylic acid vinyl ester. These are, for example, the ethylene/vinyl acetate/maleic anhydride copolymers or the ethylene/alkyl or aryl (meth)acrylate/maleic anhydride copolymers or else the ethylene/Zn or Li (meth)acrylate/maleic anhydride copolymers;

the polyethylene, polypropylene, the propylene ethylene copolymers that are grafted or copolymerized with an unsaturated carboxylic acid anhydride then condensed with a monoamino polyamide (or a polyamide oligomer). These products are described in European Patent EP 342066.

Advantageously, the enhanced-function polyolefin is selected from among the ethylene/vinyl acetate/maleic anhydride copolymers, the ethylene/propylene copolymers with propylene predominating, grafted by maleic anhydride then condensed with monoamino polyamide 6 or monoamino oligomers of caprolactam.

Very particularly, the ethylene—alkyl or aryl (meth)acrylate—unsaturated dicarboxylic acid anhydride co- or terpolymers that comprise 77 mol % to 99.2 mol % of at least one ethylene-derived pattern, 0 to 20 mol % of at least one alkyl or aryl (meth)acrylate-derived pattern and 0.8 to 3 mol % of at least one unsaturated dicarboxylic acid anhydride-derived pattern and that have a fluidity index of between 0.1 and 400 g/10 minutes measured according to NFT Standard 51-016 (190° C./feedstock of 2.16 kg) can also be cited; whereby the alkyl groups of the alkyl acrylate or methylacrylate that fall within these terpolymers can be linear, branched or cyclic and comprise up to 10 carbon atoms; as examples of alkyl (meth)acrylate that fall within the composition of these terpolymers, it is possible to cite methyl acrylate, ethyl acrylate, n-butyl acrylate, isobutyl acrylate, hexyl ethyl-2 acrylate, cyclohexyl acrylate, ethyl methacrylate, and very particularly ethyl acrylate, n-butyl acrylate and methyl acrylate; as examples of unsaturated dicarboxylic acid anhydrides that fall within the definition of these co- or terpolymers, it is possible to cite the itaconic anhydride, the citraconic anhydride, the methyl-2 maleic anhydride, the dimethyl-2,3 maleic anhydride, the bicyclo [2.2.2]-oct-5-ene 2,3-dicarboxylic anhydride, preferably the maleic anhydride; as preferred examples of these unsaturated dicarboxylic acid alkyl-anhydride ethylene-(meth)acrylate terpolymers, it is possible to cite those that are marketed under the name "LOTADER" by the ELF ATOCHEM Company, 4. the ionomers, ethylene/(meth)acrylic acid copolymers, such as the one that is marketed under the name "SURLYN" by the DuPONT Company.

As examples of pigments, it is possible to cite titanium dioxide, cobalt oxide, iron oxide, nickel titanate, organic pigments such as the derivatives of phthalocyanine and anthraquinone.

As examples of brighteners, it is possible to cite the thiophene derivatives.

The antioxidants are, for example, copper iodide combined with potassium iodide, the occupied phenol derivatives and occupied amine derivatives.

As UV stabilizers, it is possible to mention the resorcin derivatives, the benzotriazoles or the salicylates.

As chain limiters, it is possible to use monocarboxylic acids or dicarboxylic acids or aliphatic monoamines or aliphatic diamines.

Examples of reinforcement fillers are wollastonitite, glass balls, kaolin, talc, mica, the mixture of quartz, mica and chlorite that is known under the name of "plastorite," calcium carbonate and/or magnesium carbonate, glass fibers, boron nitride fibers and carbon fibers.

The compositions according to the invention can be obtained in a known way by any technique of mixing components in the molten state such as, for example, the extrusion or compounding on a single- or double-screw extruder, on a co-mixing machine or by any other continuous or intermittent technique, such as, for example, with an internal mixer.

In particular, on a co-mixing machine-type extruder, it is possible to introduce the carbon black(s) in a molten zone, the granules of the polyamide(s), if necessary modified by at least one additive as defined above, whereby a portion is introduced into the feed hopper and a portion is introduced with the carbon black(s).

This invention also relates to the processes for transformation of said compositions, as well as the articles that are obtained. The articles that are obtained can be tubes, films, pipes, plates, fibers, etc. These materials or articles can be single-layer or multilayer. In the case of multilayer materials or articles, the layer that is most exposed to the accumulation of the electrostatic charges will be based on a composition according to the invention. The invention makes it possible in particular to use an antistatic and shock-resistant single- or multilayer tube for the transport and/or storage of hydrocarbons and in particular gasoline. Among all of the conventional transformation methods used in the thermoplastics industry that are suitable for the production of articles, very particularly the extrusion and coextrusion techniques will be cited.

The following examples illustrate this invention without, however, limiting its scope.

EXAMPLES 1 to 3

As follows, respectively non-antistatic polyamide compositions (reference composition), antistatic polyamide compositions (comparison composition) and antistatic polyamide compositions (composition of the invention) that have the formulations that are given in Table 1 are prepared.

TABLE 1

| Example Formulation of the polyamide composition . . . | 1 non-anti-static (reference) | 2 anti-static (for comparison) | 3 anti-static (of the invention) |
|---|---|---|---|
| PA 12 that has an inherent viscosity of 1.65 | 84 | 76 | 62 |
| n-butyl benzene sulfonamide | 4 | 4 | 4 |
| Thermoplastic elastomer with a polyether block amide-type polyamide base with a Shore D hardness equal to 42 and a melting point of 147° C. | 12 | 12 | 12 |
| Extra-conductive carbon black marketed by the AKZO NOBEL Company under the name "Ketjenblack EC 600 JD," characterized by a DPB absorption that is greater than 400 ml/g and by a BET surface area that is greater than 1000 m$^2$/g | — | 8 | — |
| Carbon black marketed by the M.M.M. Company under the name "Ensaco 250 Granular," characterized by DBP absorption of about 190 ml/g and by a BET surface area of about 65 m$^2$/g | — | — | 22 |

To prepare the composition of Example 1, granules of plasticized polyamide that is modified by the polyether block amide are introduced into the feed hopper of a co-mixing-machine-type extruder. The extrusion material temperatures are typically on the order of 240 to 270° C. The flow rate is 15 to 20 kg/h.

To prepare the compositions of Examples 2 and 3, the carbon black is introduced into a molten zone with a force-feed hopper on a BUSS co-mixing-machine-type extruder, whereby a portion of the granules of plasticized polyamide that is modified by polyether block amide is introduced into the feed hopper, and a portion is introduced with the carbon black. The temperatures of the extrusion material are typically on the order of 240 to 270° C. The flow rate is 15 to 20 kg/h.

EXAMPLE 4

Measure of the Fluidity Index ISO Standard 1133.91)

The fluidity index (MFI) of each of the compositions of Examples 1 to 3 is measured (in g/10 minutes) at 235° C. under 10 kg (ISO Standard 1133:91). The tested samples contain less than 0.1% of moisture.

Measure of Surface Resistivity

Test indicated in paragraph 7.9 "Electrical Resistance" of SAE XJ Standard 2260)

The compositions of Examples 1 to 3 are extruded in the form of single-layer tubes with an inside diameter of 6 mm and an outside diameter of 8 mm, on a single-screw extruder that is equipped with a screw with a diameter of 45 mm, adapted to the extrusion of polyamides at temperatures of 210 to 250° C.

Cylindrical copper electrodes are introduced at the ends of a tube that is 100 mm in length. A suitable voltage is applied to these electrodes, and the current is measured. The resistance that is thus measured (coarse measurement) is then multiplied by the inside circumference of the tube, then divided by the distance between electrodes; the surface resistivity that is expressed in ohm ($\Omega$) is obtained.

Multiaxis Impact Test (ISO Standard 6603-2:89)

The compositions of Examples 1 to 3 are injected onto a press in the form of plates at temperatures of 250 to 270° C. These plates have the following dimensions: 100×100×2 mm and make it possible to carry out multiaxis impact tests at a rate of 4.3 m/s. In this test, the total energy that is absorbed (in joules) by the composition during the impact is measured. The type of breaking pattern is also noted: brittle or ductile fracture. These tests are carried out at −30° C. The plates are conditioned for 15 days at 50% relative moisture before being tested.

Test of Impact on the Tube

Test indicated in paragraph 7-6 "Cold Temperature Impact" of SAE XJ Standard 2260

The compositions of Examples 1 to 3 are extruded in the form of tubes as indicated for the measure of surface resistivity.

A mass of 0.912 kg strikes a tube perpendicularly from a height of 305 mm. A tube passes the test if after impact it preserves a resistance to the explosion (explosion pressure) that is greater than 70% of the explosion pressure of a non-impacted tube. If this is not the case, the tube is considered broken. The tubes are tested at −40° C. The tubes are conditioned for 15 days at 50% relative moisture before being tested.

The results are recorded in Table 2,

TABLE 2

| Polyamide Composition of the Example | Fluidity Index (g/10 min.) | Surface Resistivity ($\Omega$) | Multiaxis Impact Total Absorbed Energy (J) | Impact on the Tube Number of items broken/ 10 |
|---|---|---|---|---|
| 1 (reference) | >12 | >10$^{13}$ | ≥60, ductile | 0C/10 |
| 2 (for comparison) | 2–4 | 10$^2$–10$^4$ | ≤10, brittle | ≥5C/10 |
| 3 (of the invention) | 6–8 | 10$^2$–10$^4$ | ≥50, ductile | ≤1C/10 |

What is claimed is:

1. An antistatic polyamide composition comprising at least one polyamide and 16–30% by mass of carbon black based on the total composition to make it antistatic, characterized by the fact that the carbon black is at least a carbon black that is selected from among those that have a BET specific surface area, measured according to ASTM Standard D 3037-89, from 20 to 100 m$^2$/g, and DBP absorption, measured according to ASTM Standard D 2414-90, from 125 to 250 ml/100 g.

2. Articles obtained by extrusion, in particular single-layer tubes, or else multilayer tubes that are formed by coextrusion, whereby the layer that is most exposed to the accumulation of electrostatic charges is based on the polyamide composition as defined in claim 1.

3. A method of providing to a polyamide composition a plateaued volumetric resistivity, an increased impact strength and an improved fluidity, said method comprising adding to a polyamide composition 16–30% by mass of carbon black based on the total composition, said carbon black having a BET specific surface area, measured according to ASTM Standard D 3037-89, from 20 to 100 m$^2$/g, and DBP absorption, measured according to ASTM Standard D 2414-90, from 125 to 250 ml/100 g.

4. A method according to claim 3, wherein the carbon black is present in a concentration of 17.5 to 23% by mass relative to the total composition.

5. A polyamide composition according to claim 1, wherein the carbon black(s) are present at a concentration of 17.5 to 23% by mass relative to the total composition.

6. A polyamide composition according to claim 1, wherein it also contains at least one additive that is selected from the group consisting of:
- plasticizers;
- impact additives;
- phosphoric acid, phosphorus acid or hydrophosphorus acid or their esters, or sodium salts or potassium salts or combinations of these products;
- dyes;
- pigments, other than carbon black;
- brighteners;
- antioxidants;
- UV stabilizers;
- chain limiters; and
- reinforcement fillers.

7. A polyamide composition according to claim 6, wherein the plasticizers are selected from among benzene sulfonamide derivatives, hydro-benzoic acid esters, lactones, esters or ethers of tetrahydrofurfuryl alcohol and esters of citric acid or hydroxymalonic acid.

8. Polyamide composition according to claim 7, wherein the plasticizer is n-butyl-benzene sulfonamide (BBSA).

9. Polyamide composition according to claim 6, wherein the amount of plasticizer(s) goes up to 30% by mass relative to the total composition.

10. A process comprising extruding the polyamide composition as defined in claim 1 so as to form extruded articles.

11. A process according to claim 10, wherein on a co-mixing-machine-type extruder, the carbon black(s) are introduced in a molten zone, a portion of the granules of the polyamide(s), optionally modified by at least one additive selected from the group consisting of
- plasticizers;
- impact additives;
- phosphoric acid, phosphorus acid or hydrophosphorus acid or their esters, or sodium salts or potassium salts or combinations of these products;
- dyes;
- pigments, other than carbon black;
- brighteners;
- antioxidants;
- UV stabilizers;
- chain limiters; and
- reinforcement fillers, being introduced in the feed hopper, and a portion being introduced with the carbon black(s).

12. Articles obtained from a polyamide composition as defined in claim 1.

* * * * *